(12) United States Patent
Golub et al.

(10) Patent No.: US 6,810,165 B2
(45) Date of Patent: Oct. 26, 2004

(54) OPTICAL CROSS CONNECT UTILIZING FREE SPACE OPTICS AND AN ARRAY OF MICRO MIRRORS

(75) Inventors: John E. Golub, Atlanta, GA (US); David A. Smith, Cleveland, OH (US); Harry Presley, Jonesboro, GA (US); Zhuoyu Bao, Norcross, GA (US)

(73) Assignee: Movaz Networks, Inc., Norcross, GA (US)

( * ) Notice: Subject to any disclaimer, the term of this patent is extended or adjusted under 35 U.S.C. 154(b) by 0 days.

(21) Appl. No.: 10/764,702

(22) Filed: Jan. 26, 2004

(65) Prior Publication Data

US 2004/0156581 A1 Aug. 12, 2004

Related U.S. Application Data

(63) Continuation of application No. 10/120,869, filed on Apr. 11, 2002, now Pat. No. 6,694,073, and a continuation-in-part of application No. 09/957,312, filed on Sep. 20, 2001.
(60) Provisional application No. 60/283,605, filed on Apr. 13, 2001.

(51) Int. Cl.[7] .............................................. G02B 6/026
(52) U.S. Cl. ........................................ 385/18; 359/333
(58) Field of Search ............................... 385/15, 16, 24, 385/18, 19, 31, 39, 136, 137; 356/330; 359/333, 334

(56) References Cited

U.S. PATENT DOCUMENTS

| | | | |
|---|---|---|---|
| 4,911,526 A | 3/1990 | Hsu et al. | 350/96.24 |
| 5,414,540 A | 5/1995 | Patel et al. | 359/39 |
| 5,504,575 A | 4/1996 | Stafford | 356/330 |
| 5,771,320 A | 6/1998 | Stone | 385/16 |
| 5,796,479 A | 8/1998 | Derickson et al. | 356/326 |
| 5,960,133 A | 9/1999 | Tomlinson | 385/18 |
| 6,097,859 A | 8/2000 | Solgaard et al. | 385/17 |
| 6,101,299 A | 8/2000 | Laor | 385/16 |
| 6,204,946 B1 | 3/2001 | Aksyuk et al. | 359/131 |
| 6,263,123 B1 | 7/2001 | Bishop et al. | 385/15 |
| 6,694,073 B2 * | 2/2004 | Golub et al. | 385/18 |
| 2001/0033707 A1 * | 10/2001 | Patel | 385/16 |
| 2002/0071627 A1 * | 6/2002 | Smith et al. | 385/15 |
| 2002/0164114 A1 * | 11/2002 | Golub et al. | 385/18 |
| 2003/0223104 A1 * | 12/2003 | Kinoshita et al. | 359/333 |
| 2004/0086218 A1 * | 5/2004 | Liu et al. | 385/18 |

FOREIGN PATENT DOCUMENTS

| | | |
|---|---|---|
| EP | 0 729 044 | 8/1996 |
| EP | 0 984 311 | 3/2000 |

OTHER PUBLICATIONS

Gibong Jeong et al., "Comparison of Wavelength–Interchanging and Wavelength–Selective Cross–Connects in Multiwavelength All–Optical Networks", *IEEE*, 1996, 156–163 pp.

* cited by examiner

*Primary Examiner*—Akm Enayet Ullah
(74) *Attorney, Agent, or Firm*—Charles S. Guenzer (57) ABSTRACT

An optical cross connect, especially a wavelength cross connect, using free-space optics, a diffraction grating, and a micro electromechanical systems (MEMS) array of movable mirrors. A concentrator receives light from widely separated optical fibers and brings the beams together into a more closely spaced linear array. Free-space optics process all the beams. Front-end optics collimate the beams from the fibers and flatten their fields. The diffraction grating spectrally separates each beam into sub-beams. A long-focus lens focuses the sub-beams onto the 2-dimensional MEMS array. A fold mirror reflectively couples two such mirrors, whereby the switched signals propagate back through the same optics and are spectrally recombined onto the fibers. Other embodiments include white-color cross connects, multiple MEMS arrays, and parallel optics. Power dividers or wavelength interleavers can divide signals from the fibers, and multiple cross connects switch different wavelength groups.

17 Claims, 8 Drawing Sheets

OPTICAL CROSS CONNECT UTILIZING FREE SPACE OPTICS AND AN ARRAY OF MICRO MIRRORS

RELATED APPLICATIONS

This application is a continuation of Ser. No. 10/120,869, filed Apr. 11, 2002, now U.S. Pat. No. 6,694,073 issue fee paid, which claims benefit of U.S. provisional application Ser. No. 60/283,605 filed Apr. 13, 2001 and is a continuation in part of Ser. No. 09/957,312 filed Sep. 20, 2001.

FIELD OF THE INVENTION

The invention relates generally to multi-wavelength optical switches. In particular, the invention relates to optical switches using micro electromechanical system (MEMS) switching elements.

BACKGROUND ART

Modern communications networks, particularly those extending over long distances, increasingly use silica optical fiber as the transmission medium. In the originally implemented fiber-based networks, each fiber carries a single optical carrier at a wavelength in one of the silica transmission bands that extend across ranges in the neighborhoods of 850, 1310, and 1550 nm. At the transmitting end, a laser emitting at this wavelength or an associated electro optical modulator is modulated by an electrical data signal, and the modulated narrow-band light is input to the fiber. At the receiving end of the fiber, a photodetector receives the modulated light and converts it back to electrical form. While the fiber itself has a transmission bandwidth measured in hundreds of terahertz, the data transmission rates are limited to the speed of the electronics associated with the transmitter and receiver, currently about 10 gigabits per second. It was quickly recognized however that the transmission bandwidth of a fiber can be greatly increased by wavelength division multiplexing (WDM). For example, W lasers at the transmitting end, where W may be forty or more, output at respective ones of W wavelengths in one of the silica transmission bands, and their outputs are modulated by respective data signals. The wavelength spacings in the 1550 nm band may be 1 nm or less. All the modulated optical carriers are combined and input to a single transmission fiber. At the receiving end of the fiber, a wavelength dispersive element such as a diffraction grating or prism wavelength divides the received multi-wavelength optical signal into W respective spatial paths. A photodetector and associated electronics are associated with each of these paths. Thereby, the transmission capacity of the fiber is increased by a factor of W because of the parallel operation of W sets of electronics.

Modern communication networks tend to be more complicated than the point-to-point system described above. Instead, most public networks include multiple nodes at which signals received on one incoming link can be selectively switched to different ones of outgoing links. For electronic links, conventional electronic switches directly switch the electronic transmission signals. Fiber links present a more difficult switching problem.

In the most straightforward approach, each node interconnecting multiple fiber links includes an optical receiver which converts the signals from optical to electrical form, a conventional electronic switch which switches the electrical data signals, and an optical transmitter which converts the switched signals from electrical back to optical form. In a WDM system, this optical/electrical/optical (O/E/O) conversion must be performed by separate receivers and transmitters for each of the W wavelengths. This replication of O/E/O components prevents the economical implementation of WDM for a large number W of wavelength channels.

Another approach implements wavelength switching in an all-optical network. In a version of this approach that may be used with the invention, the W wavelength components from an incoming multi-wavelength fiber are wavelength demultiplexed into the different spatial paths. Optical switching elements then switch the wavelength-separated signals in the desired directions before a multiplexer recombines the optical signals of differing wavelengths onto a single outgoing fiber. In conventional terminology, all the optical switching elements and associated multiplexers and demultiplexers are incorporated into a wavelength cross connect (WXC), which is a special case of an enhanced optical cross connect (OXC). Advantageously, all the optical switching elements can be implemented in a single chip of a micro electromechanical system (MEMS). The MEMS chip includes a two-dimensional array of tiltable mirrors which may be separately controlled. Solgaard et al. describe the functional configuration of such a MEMS wavelength cross connect in U.S. Pat. No. 6,097,859, incorporated herein by reference in its entirety. Each MEMS mirror receives a unique optical signal of a single wavelength from an incoming fiber and can switch it to any of multiple outgoing fibers. The entire switching array of several hundred mirrors can be fabricated on a chip having dimension of less than 1 cm by techniques well developed in the semiconductor integrated circuit industry.

However, such a wavelength optical cross connect needs to be installed in the field and to retain its calibration under somewhat harsh conditions without the need for frequent routine maintenance. Its packaging should be relatively compact to allow its installation in existing switching facilities and in perhaps remote locations. The cost and complexity need to be minimized.

Smith et al. in U.S. patent application Ser. No. 09/957,312, filed Sep. 20, 2001, incorporated herein by reference in its entirety, sketchily discloses a more compact package including condensed physical optics such as folding mirrors. A similar disclosure is published as International Publication No. WO 02/25358 A2. However, that description is directed more to features other than the optics.

A wavelength cross connect advantageously is connected to many optical fiber transmission links, and the number of WDM wavelengths is also advantageously large. The design of the wavelength switching system becomes increasingly difficult for a large number of input/output fibers and a large number of wavelengths. Further, for a large number of fibers and wavelengths, it becomes increasingly difficult to fabricate all the required MEMS mirrors in a single substrate.

SUMMARY OF THE INVENTION

A optical cross connect (OXC) is based on free-space optics and an array of micro electromechanical system (MEMS) mirrors for selectively switching optical signals between waveguides, such as optical fibers. For a wavelength optical cross connect (WXC), the MEMS mirrors may be arranged in a two-dimensional array, preferably within the same plane and more preferably within a same substrate. The two-dimensional mirror array extends in a fiber direction and in a perpendicular wavelength direction.

Transmission fibers are coupled into the free-space optics through a concentrator which couples on a first side to the fibers spaced by distances representative of the diameter of single-mode optical fiber, for example, at least 125 µm. The concentrator includes optical waveguides which curve so that the distances between the waveguide decrease from the first side of the concentrator to the second side which has an output facet to the free-space optics. At the second side, the waveguides are arranged in a linear array spaced by a much smaller distance, for example, 20 to 50 µm and couple to beams arranged around respective parallel axes in a plane. The concentrator waveguides may be planar waveguides formed in a substrate, or they may be optical fiber aligned to curved grooves formed in a substrate and preferably having ends tapered at the input to the free-space optics.

The free-space optics may be arranged in and about a principal optical plane. The fibers or other waveguides are preferably arranged in one or more linear arrays extending a small distance perpendicular to the principal plane, for example, as determined by the concentrator, and inputting parallel beams to the free-space optics. More preferably, both input and output waveguides are arranged in a single linear array. More preferably also, a folding mirror reflectively couples selected pairs of mirrors in the MEMS array with one mirror acting as an input mirror and the other as an output mirror. The tilts of the selected input and output mirrors are controlled in pairs to produce the reflective coupling. Further, the MEMS array may be inclined, for example, at 45° to the principal plane to allow the folding mirrors to be placed parallel to the principal plane.

The free-space optics may include a collimating lens system, preferably including a field-flattening element. A wavelength dispersive element, such as a diffraction grating, may be placed between the collimating lens system and the MEMS array to separate wavelength components of the waveguided signals. A focusing lens is preferably disposed between the wavelength dispersive element and the MEMS array and has a focus point near the MEMS array. If a fold mirror is used, the focus point is on or near the fold mirror. Alternatively, the focus point may be on the MEMS array or between it and the fold mirror. Closely spaced waveguides ends are imaged onto the MEMS array with a magnification determined by the ratio of the focal lengths of the collimating lens system and the focusing lens. The magnification is preferably between 10 and 100, and more preferably between 20 and 50. The optics preferably are designed to be telecentric producing parallel beams and sub-beams, at least in the wavelength direction.

The free-space optics may include a prism to compensate for the astigmatism of the wavelength dispersive element, such as a diffraction grating. By the use of multiple mirrors, the free-space optics may be arranged along a twisted optical axis that crosses itself, thereby reducing the size of the package.

The scaling of the invention to larger number of fibers or of wavelengths can be eased by use of multiple MEMS arrays. Multiple MEMS arrays can be bonded onto a common substrate, thus forming a mosaic array. Separate MEMS arrays can be used for input and output mirrors, and the input and output mirrors of the two arrays may be directly coupled without the need for a fold mirror. Separate sets of optics and waveguide arrays may be used on the input and output with the two arrays. Alternatively, the wavelength separated sub-beams produced by the wavelength dispersive element may be grouped and directed through different sets of back-end optics and MEMS arrays.

The scaling can also be facilitated by splitting the waveguide signals into two or more parallel paths by means of one or more stages of divider/combiners, such as power splitters or wavelength interleavers. Free-space optical or wavelength interconnects optically switch different wavelengths while assuring that the unswitched wavelengths are absorbed or otherwise do not interfere.

The invention also includes the method of operating such optical cross connects.

DETAILED DESCRIPTION OF THE PREFERRED EMBODIMENTS

Figure 1:
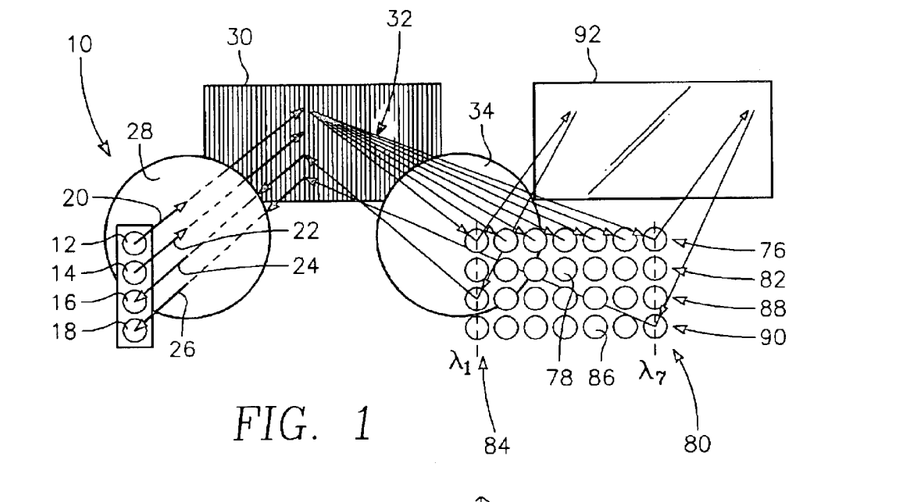
FIG. 1 is a schematic illustration of the functions of a wavelength cross connect implemented with a mirror array.

The invention will be explained in the context of a wavelength cross connect (WXC) for a wavelength division multiplexing (WDM) communications network using a micro electromechanical system (MEMS) switching fabric. The functions for a WXC are of themselves complex, but when implemented in a compact system it is difficult to visualize the three-dimensional array of beams. To facilitate understanding, a frictional schematic diagram of a MEMS-based a 2-input, 2-output, 7-wavelength cross connect 10 is illustrated in FIG. 1, as shown generally in the Smith et al. reference, although significantly greater numbers of fibers and wavelengths are contemplated. Two input fiber waveguides 12, 14 and two output fiber waveguides 16, 18 are aligned linearly parallel to each other to couple the waveguided signals into two free-space input beams 20, 22 and from two free-space output beams 24, 26. Thereafter, free-space optics guide and spatially switch the light. By free-space optics is means optics based on free-standing and discrete optical elements, such as refractive or reflective lenses, mirrors, and diffraction gratings that optically process optical beams that are not waveguided but propagate in free space. As part of the free-space optics, a lens 28 collimates the input beams 20, 22 to both strike a diffraction grating 30.

Considering the first input beam 20, the diffraction grating 30 angularly disperses it into a fan-shaped collection 32 of beams angularly separated according to wavelength. The wavelengths of the signals on the one input fiber 12, as well as on all the other fibers 12, 16, 18, correspond to the WDM wavelengths of one of the standardized grids, for example, the International Telecommunications Union (ITU) grid, and each optical carrier signal of the different wavelengths on the separate fibers is modulated according to its own data signal. Each of the beams in the beam collection 32 corresponds to one of the wavelength channels of the ITU grid. A lens 34 focuses these beams toward a first row 76 of tiltable input mirrors 78, typically formed as a two-dimensional array 80 in the plane of a MEMS structure. The mirrors 78 of the first row 76 are associated with the wavelength channels of the first input fiber 12 while those in a second row 82 are associated with the second input fiber 14. The mirrors 78 are also arranged in a second dimension in which each column 84 is associated with one of the wavelengths $\lambda_1$ through $\lambda_7$ for the illustrated 7-wavelength system where $\lambda$ is the common symbol in the telecommunications industry for optical wavelength. The mirrors 78 described to this point are input mirrors. Similarly arranged mirrors 86 in rows 88, 90 are output mirrors. The mirrors 78, 86 are tiltable about respective pairs of perpendicular axes lying generally horizontally in the illustration so that the input mirrors 78 direct each input beam 20, 24 toward a folding mirror 92. Depending upon the tilt angle of the respective input mirror 78, the folding mirror 92 reflects that beam to the output mirror 86 in a selected one of the output rows 88, 90. The selected output mirror 86 is correspondingly tilted to reflect the beam it receives from the folding mirror 92 into a direction in the principal optical plane back towards the selected output fiber 16, 18. The two illustrated connections show coupling of different wavelength components from the first input fiber 12 to output mirrors 86 located alternatively in the third and fourth rows 88, 90. The output mirrors of the third row 88 are associated with respective wavelength channels on the first output fiber 16 while those of the fourth row 90 are associated with the wavelength channels on the second output fiber 18. The optics are arranged and controlled such that an optical signal from an input mirror 78 is reflected only to one of the output mirrors 86 in the same column 84, that is, to one associated with the same WDM wavelength. The input and output mirrors 78, 86 typically have the same construction and differ only by their placement in the two-imensional array 80 in a single MEMS structure. Practically speaking, in this configuration, the designation of input and output mirrors is arbitrary and the input and output rows may be interleaved.

However, there are other switch designs in which the input and output mirrors are formed in separate MEMS arrays. Such a dual array allows the elimination of the folding mirror. In some applications, it is possible to use only a single array of micromirrors without a folding mirror to directly reflect a wavelength-separated input beam back to a selected output fiber. However, this configuration presents problems with uniformity of coupling and greatly complicates the optics and MEMS design.

Each output mirror 86 is also tiltable in correspondence to the tilt angle of the input mirror 76 to which it is coupled through the folding mirror 92, which operates as a symmetry plane of the system. As a result, the same optics 28, 30, 34 used to focus and demultiplex the beams from the input fibers 12, 14 are also used to multiplex the wavelength-separated output beams onto the two output fibers 16, 18. That is, the diffraction grating 30 acts both as a demultiplexer on the input and as a multiplexer on the output.

By means of the illustrated optics and MEMS micromirror array 80, a wavelength channel on either of the input fibers 12, 14 can be switched to the same wavelength channel on either of the output fibers 16, 18. It is of course understood that the described structure may be generalized to more input and output fibers and to more WDM wavelengths.

The following description of the structure of a cross connect of the invention will be simplified by the appreciation that there is no physical distinction between input and output beams. The same optics perform reciprocal functions, such as focusing and defocusing (e.g., collimating), on beams traversing the optics in opposite directions. Therefore, the discussion will largely concentrate on the input beams but will apply as well to the output beams propagating in the reverse direction.

Figure 2:
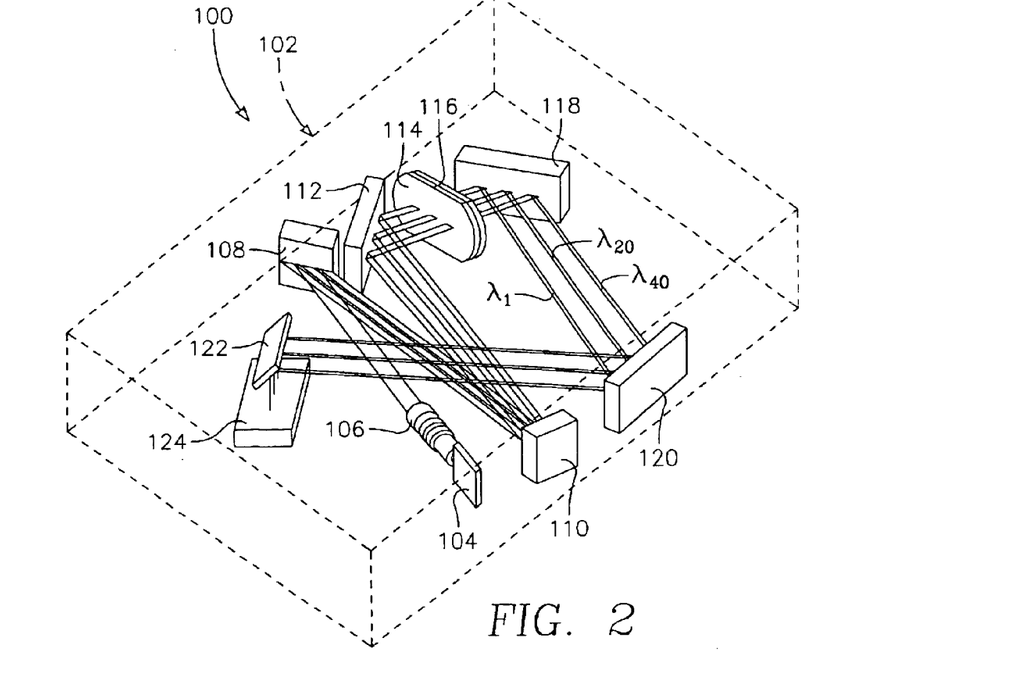
FIG. 2 is an orthographic view of a practical wavelength cross connect including a micromirror array.

With this understanding of the functions of the system, a more practical wavelength cross connect 100 illustrated in the orthographic view of FIG. 2 is designed to switch 40 wavelength channels on 100 GHz frequency spacings (about 0.8 nm in wavelength at 1550 nm) between 6 input fibers and 6 output fibers. That is, the exemplary design is based on 12 fibers and 40 wavelengths. According to one nomenclature, the design results in a $12^f \times 40^w$ WXC. The required components of this WXC can fit in a package within a form factor 102 of about 3.8×20×23 cm. In an overview, the cross connect 100 includes a concentrator 104, typically implemented in a single chip, which receives the twelve fibers in a linear alignment. Twelve waveguides having curved shapes within the concentrator 104 are coupled to the twelve fibers and bring their beams closer together on the side of the cross connect 100 and output the beams in parallel in a linearly spaced grid. A collimation lens system 106 collimates the beams diverging from the concentrator waveguides and directs them in a linearly arrayed set of twelve beams to a diffraction grating 108. The diffraction grating 108 spectrally separates the beams into twelve fan-shaped beams. Only a single fan-shaped beam is illustrated, and only the sub-beams associated with the lowest, middle, and highest wavelengths $\lambda_1, \lambda_{20}, \lambda_{40}$ of forty wavelengths are explicitly shown although there are forty sub-beams in total for each fiber in the described embodiment. Two planar mirrors 110, 112 reflect the beams and extend their path lengths before they pass through a lens 114 and a quarter-wave plate 116. The lens 114 focuses each of the two-dimensional array of beams at the symmetry point of the system to be described later. Two more planar mirrors 118, 120 reflect the beams and extend their paths lengths within the form factor 102 before they strike respective tiltable micromirrors in a 12×40 MEMS chip 122. The free-space optics allow the beams to cross each other as illustrated without any interference. The MEMS chip 122 may be tilted at 45° with respect to the plane of the optics previously described so that the beams are reflected generally downwardly to a planar fold mirror 124 extending parallel to the previously described plane. The fold mirror 124 forms a symmetry plane, and the lenses 106, 114 focus the spectrally separated outputs of the fibers on the fold mirror 124

Figure 3:
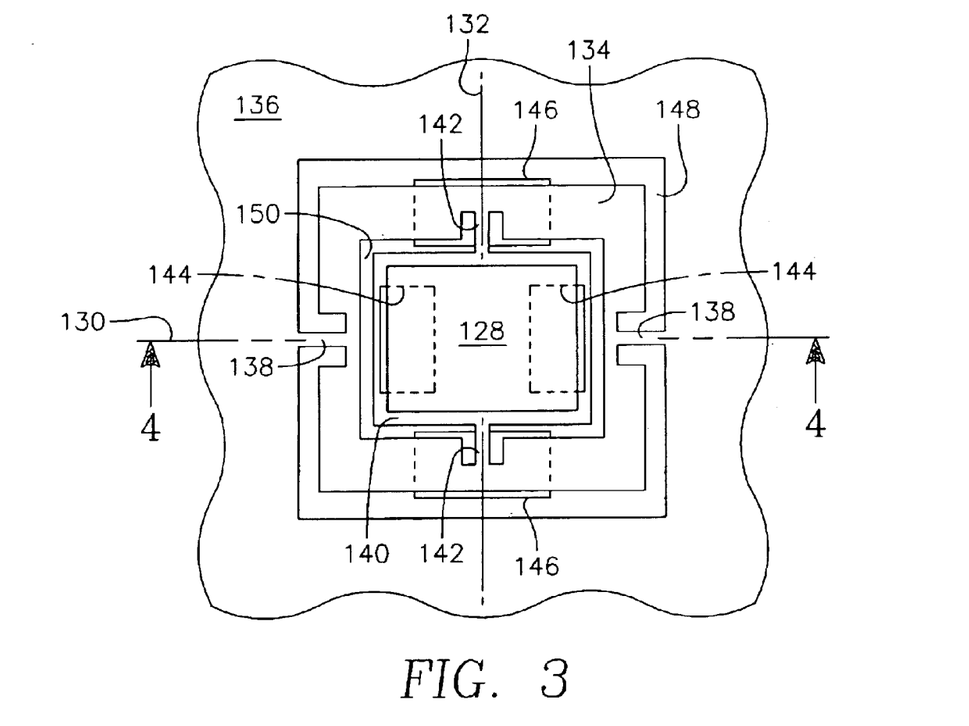
FIG. 3 is a plan view of a micromirror fabricated as a micro electromechanical system (MEMS).
Figure 4:
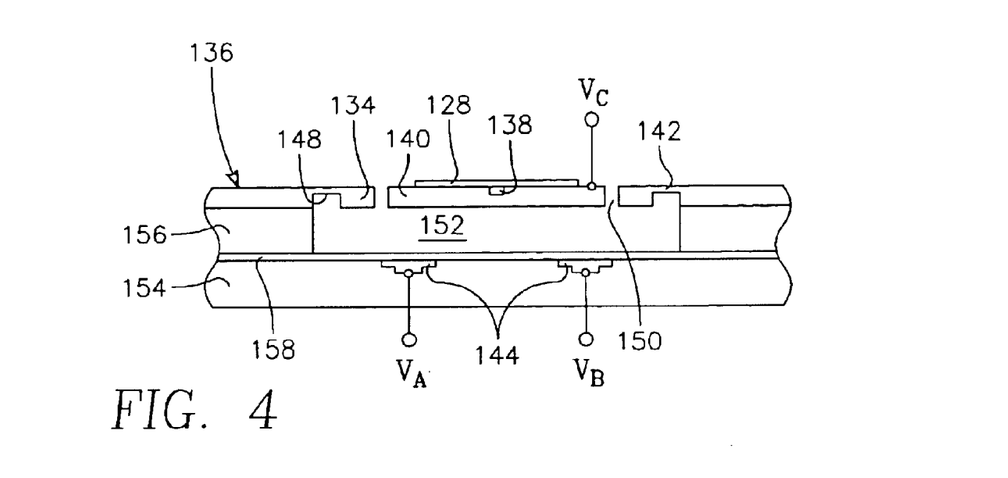
FIG. 4 is a cross-sectional view of the micromirror of FIG. 3 taken along view line 4—4.

The operation of the MEMS mirror array 122 typically limits the performance of the system and hence drives the optical design. Therefore, MEMS technology and the arrangement of the mirror array will be described first. There are several ways of forming the MEMS micromirror array. An exemplary structure shown in plan view in FIG. 3 and in cross section in FIG. 4 provides two-dimensional tilting of a mirror 128 about two orthogonal axes 130, 132. The illustrated cell is one of many such cells arranged typically in a two-dimensional array in a bonded structure including multiple levels of silicon and oxide layers in what is referred to as a multi-level silicon-over-insulator (SOI) structure. The cell includes a gimbal structure of a frame 134 twistably supported in a support structure 136 of the MEMS array through a first pair of torsion beams 138 extending along and twisting about the minor axis 130. The cell further includes a mirror plate 140 having the mirror 128 formed thereon as a reflective surface 128. The mirror plate 140 is twistably supported on the frame 134 through a second pair of torsion beams 142 arranged along the major axis 132 perpendicular to the minor axis 130 and twisting thereabout. In one MEMS fabrication technique, the illustrated structure is integrally formed in an epitaxial (epi) layer of crystalline silicon. The process has been disclosed in U.S. Provisional Application Serial No. 60/362,898, filed Mar. 8, 2002, incorporated herein by reference in its entirety. However, other fabrication processes resulting in somewhat different structures may be used without affecting the present invention.

The structure is controllably tilted in two independent dimensions by a pair of electrodes 144 under the mirror plate 140 and another pair of electrodes 146 under the frame 134. The electrodes 144, 146 are symmetrically disposed as pairs across the axes 130, 132 of their respective pairs of torsion beams 138, 142. A pair of voltage signals $V_A$, $V_B$ are applied to the two mirror electrodes 144, and another pair of voltage signals are applied to the frame electrodes 146 while a common node voltage signal $V_C$ is applied to both the mirror plate 140 and the frame 134.

Horizontally extending air gaps 148, 150 are formed respectively between the frame 134 and the support structure 136 excluding the one pair of torsion beams 138 and between the mirror plate 140 and the frame 134 excluding the other pair of torsion beams 142 and overlie a cavity or vertical gap 152 formed beneath the frame 134 and mirror plate 140 so that the two parts can rotate. The support structure 136, the frame 134, and the mirror plate 140 are driven by the common node voltage $V_C$, and the frame 134 and mirror plate 140 form one set of plates for variable gap capacitors. Although FIG. 3 illustrates the common node voltage $V_C$ being connected to the mirror plate 140, in practice the electrical contact is made in the support structure 136 and electrical leads are formed on top of the torsion beams 138, 142 to apply the common node voltage signal to both the frame 134 and the mirror plate 140 which act as a top electrodes. The electrodes 144, 146 are formed at the bottom of the cavity 152 so that the cavity 152 forms the gap of the four capacitors, two between the bottom electrodes 146 and the frame 134, and two between the bottom electrodes 144 and the mirror plate 140.

The torsion beams 138, 142 act as twist springs attempting to restore the frame 134 and the mirror plate 140 to neutral tilt positions typically parallel to the principal plane of the chip. Any voltage applied across opposed electrodes exerts a positive force acting to overcome the torsion beams 136, 140 and to close the variable gap between the top electrode and the more strongly biased bottom electrode. The force is approximately linearly proportional to the magnitude of the applied voltage, but non-linearities exist for large deflections. If an AC drive signal is applied well above the resonant frequency of the mechanical elements, the force is approximately linearly proportional to the root mean square (RMS) value of the AC signal. In practice, the precise voltages needed to achieve a particular tilt are experimentally determined.

Because the capacitors in the illustrated configuration are paired across the respective torsion beams 138, 142, the amount of tilt is determined by the difference of the RMS voltages applied to the two capacitors of the pair. The tilt can be controlled in either direction depending upon the sign of the difference between the two RMS voltages.

As shown in FIG. 4, the device has a large lower substrate region 154 and a thin upper MEMS region 156, separated by a thin insulating oxide layer 158 but bonded together in a unitary structure. The tilting actuators are etched into the upper region 156, each actuator suspended over the cavity 152 by several tethers associated with the torsion beams 138, 142. The electrodes are patterned onto the substrate 154, which can be an application specific integrated circuit (ASIC), a ceramic plate, a printed wiring board, or some other substrate with conductors patterned on its surface. The actuators in the upper region form a single electrical node called the "common node". Each actuator is suspended above four electrodes 144, 146, each electrode being isolated from every other electrode. To cause the actuator to tilt in a specific direction, an electrostatic force is applied between the actuator and one or more of its electrodes by imposing a potential difference between the common node and the desired electrode. Each actuator has two pairs of complementary electrodes, one pair 146 causing tilt about the major axis 132 and the other pair 146 causing tilt about the minor axis 130. Fabrication details are supplied in the aforementioned provisional application No. 60/362,898.

The mirrors 128 of the mirror array are formed within a single substrate 154 in a rectangular two-dimensional array arranged in a fiber direction and a wavelength direction. Tilting of the mirrors 128 about the respective major axes switches optical signals between the input and output fibers while tilting about the respective minor axes tunes the optical coupling and may be used for intentional power degradation as described by Smith et al. in the aforementioned patent application. Garverick et al. disclose an electronic method for controlling the mirror tilt in U.S. patent application Ser. No. 09/884,676, filed Jun. 19, 2001, now issued as U.S. Pat. No. 6,543,286.

Figure 5:
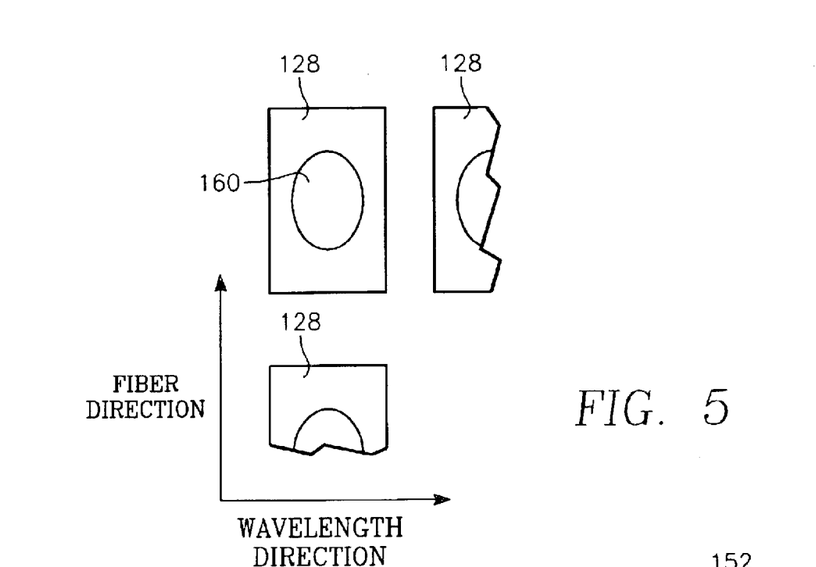
FIG. 5 is a fragmentary plan view of a micromirror array and incident beams.

A typical mirror arrangement, as illustrated in the fragmentary plan view of FIG. 5 includes mirrors 128 each having dimensions of 470 µm in the wavelength direction and 750 µm in the fiber direction. The mirrors are arranged on spacings of 665 µm in the wavelength direction and 1050 µm in the fiber direction. The optics are designed to irradiate each mirror 128 with an elliptically shaped spot 160, the edges showing the $e^{-2}$ intensity contours relative to the center. The spot 160 has a minor axis in the wavelength direction of 290 µm and a major axis in the fiber direction of 400 µm. The ellipticity arises mainly from the 45° tilt of the MEMS chip 122. A 12×40 array 152 of such mirrors 128 is illustrated in the plan view of FIG. 6. The two-dimensional array 152 spans about 25.9 mm in the wavelength direction and 11.7 mm in the fiber direction.

Figure 7:
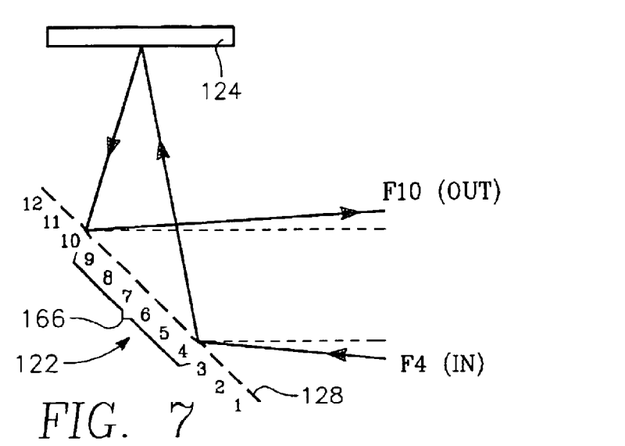
FIG. 7 is a schematic illustration of input and output mirrors coupled through a folding mirror.

The twist switching through a pair of mirrors in illustrated in the schematic illustration of FIG. 7, which illustrates one wavelength row of twelve tiltable mirrors 128 linearly arranged in the MEMS chip 122 along the fiber direction.

Each mirror 128 is associated one of the input and output fibers and is correspondingly either an input mirror or an output mirror. One constraint in designing the torque beam tilting is the maximum tilt angle. The maximum tilt angle can be minimized by bracketing the input mirrors between the output mirrors or vice versa. For example, as illustrated in FIG. 7, the centermost mirrors, that is, the fourth through ninth mirrors 128, are input mirrors associated with respective ones of the input fibers and arranged in a contiguous set 166, and the outermost mirrors, that is, the first through third and the tenth through twelfth mirrors 128, are output mirrors associated with respective ones of the output fibers bracketing the set 166 of input mirrors 128. The effect is maximized when an equal number of output mirrors are disposed on each side. For equivalent effect, the input mirrors may be on the outside and the output mirrors on the inside.

To couple the fourth, input fiber to the tenth, output fiber as illustrated, the two associated mirrors 128 are twisted such that the mirror reflected beams are specularly reflected from the fold mirror. That is, the two reflected beams are incident on the same spot of the fold mirror 124 at equal but opposite angles about a normal to the mirror 124 at that spot. As illustrated in FIG. 7, beams F4 and F10 associated with the fourth and tenth fibers respectively are tilted slightly with respect to the principal plane of the optics, to which the illustrated dashed lines are parallel. The amount of beam tiling becomes increasingly larger with increasing distance from the principal optical plane, which by design intersects the middle of the MEMS mirror array 122. In the figure, the central optical plane passes between the sixth and seventh mirrors 128. The beams will tilt in a "toe-in" direction on either side of the optical axis. That is, the beams tend towards the optical axis as they approach the MEMS array 122. While this effect is not a necessary condition for the design or function of the invention, it illustrates a significant design freedom in the optical system whereby the maximum required MEMS mirror tilt angle can be reduced by the maximum amount of beam tilting occurring at the outer fibers.

Figure 8:
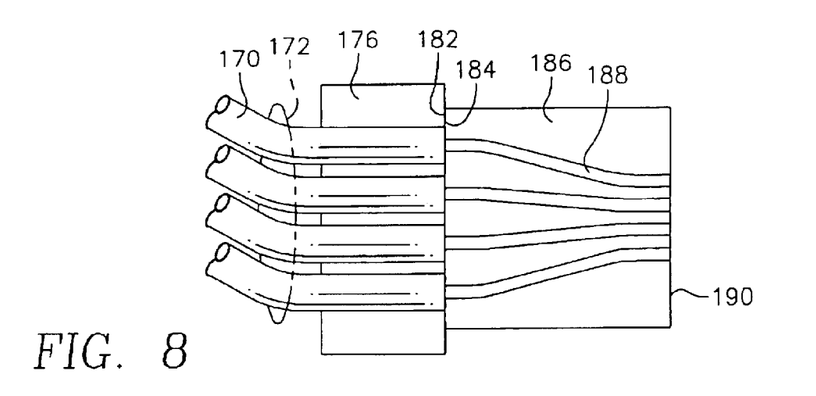
FIG. 8 is a plan view of an optical concentrator using planar waveguide.

The concentrator 104, as schematically illustrated in FIG. 8 interfaces widely separated optical fibers 170 with the closely spaced parallel beams preferred for the free-space optics of the WXC 100 of FIG. 2. The multiple fibers 170 are typically bundled in a planar ribbon 172. Unillustrated V-shaped grooves in a holder substrate 176 hold the fibers 170 with a spacing of, for example, 127 $\mu$m. Although a core of the fiber 170 has a relatively small size of about 8 $\mu$m, its outer glass cladding results in a fiber diameter of approximately 125 $\mu$m. The large number of fibers which can be handled by the single set of free-space optics of the invention arranged along an optical axis make it difficult to process a large number of fiber beams with such a large spacing between them because the outermost fiber beams are so far off the optical axis. Also, as discussed in more detail below, a significant amount of optical magnification is required between these fibers and the MEMS mirror array, and the MEMS design and function are greatly simplified as a result of concentrating the fiber spacing.

Instead, according to the invention, the fibers 170 held in the holder substrate 176 meet at a holder output face 182 with an input face 184 of a waveguide concentrator chip 186, which includes a number of single-mode, perhaps planar waveguides 188 formed in the concentrator chip 186. Typically, epoxy is used to join the fiber holder 176 and the concentrator chip 186 and to index match the fibers 170 and the planar waveguides 188.

The waveguides 188 at the input face 184 of the concentrator chip 186 have a spacing matching that of the fibers 170 aligned to the fiber holder 176 but curve over a length of about 20 mm to create a reduced spacing at an output face 190 of the concentrator chip 186, for example, 30 or 40 $\mu$m and preferably no more than 50 $\mu$m.

Figure 9:
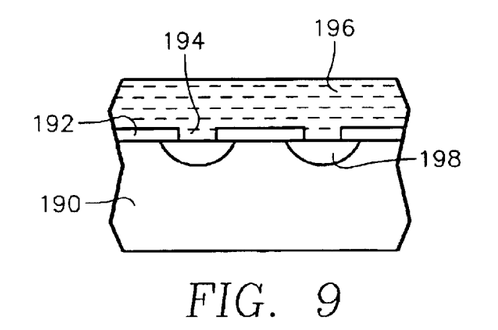
FIG. 9 is a cross-sectional view of a first step of a process for forming planar waveguides.
Figure 10:
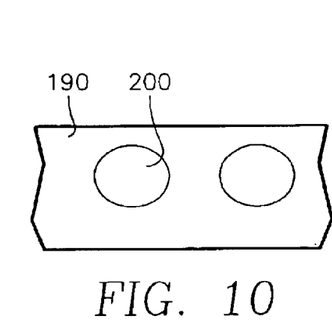
FIG. 10 is a cross-sectional view of the planar waveguide structure resulting from the process of FIG. 9.

The planar waveguides 188 can be easily formed by a conventional ion exchange technique, such as is available from WaveSplitter Technologies of Fremont, Calif. As illustrated in the cross-sectional view of FIG. 9, a silicate glass substrate 190 is formed of a amorphous silica ($SiO_2$) network through which sodium ions ($Na^+$) are relatively mobile. The principal surface of the glass substrate 190 is covered with a metal mask 192 having a plurality of apertures 194 corresponding to the waveguide pattern of FIG. 8. The patterned glass substrate 190 is placed in a molten salt bath 196 of $A^-M^+$, where the anion $A^-$ is typically $NO_3^-$ and the monovalent cation $M^+$ may be $Ag^+$. A very active $Na^+/Ag^+$ ion exchange occurs in the substrate 190 creating doped regions 198 beneath the mask apertures. The doped regions 198 have a higher refractive index than the surrounding undoped glass and thus can serve as optical waveguides. However, their half-elliptical shape is optically disadvantageous. Therefore, after completion of ion exchange, a vertical electric field is applied to the substrate to draw the positive ions into the glass substrate 190 to create nearly circular doped regions 200 illustrated in the cross-sectional view of FIG. 10. These serve as the planar optical waveguides 188, which are surrounded on all sides by the lower-index glass. Other methods are available for forming planar waveguide.

The fibers 170 of FIG. 8 are aligned to the planar waveguides 188 at the input face 184 of the concentrator chip 186. Preferably, the fiber end faces are inclined by about 8° to the planar waveguides 188 in order to virtually eliminate back reflections between the fibers 170 and waveguides 188.

Figure 11:
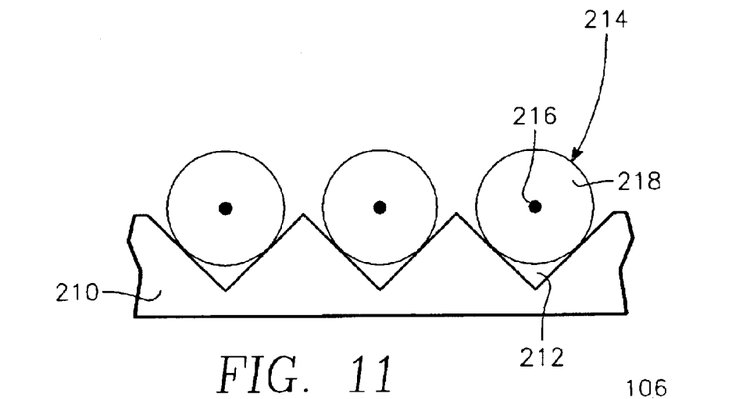
FIG. 11 is a cross-sectional view of an optical concentrator using only optical fiber.

Another type of concentrator 104 relies entirely upon optical fiber. A fiber holder substrate 210, illustrated in the cross-sectional view of FIG. 11 is patterned by precision photolithographic techniques with a series of V-shaped grooves 212 in the general planar pattern of the waveguides 188 of FIG. 8. Single-mode optical fibers 214 having cores 216 surrounded by claddings 218 are butt coupled to the input/output fibers 170 or are simply continuations of them. Typical core and cladding diameters are respectively 8.2 $\mu$m and 125 $\mu$m. However, for the illustrated concentrator, the claddings 218 at the ends of the fibers 218 are tapered to have a diameter corresponding to no more than the desired core-to-core spacing at the output of the concentrator, for example, 40 $\mu$m, but with sufficient cladding thickness to provide waveguiding. The tapered fibers 214 are placed into the grooves 212 with their tapered ends forming inputs to the free-space cross connect. The all-fiber design eliminates the tedious alignment and in-path epoxy joint of the combination waveguides of FIG. 8. It also eliminates polarization-related effects arising in planar waveguides.

The concentrator creates a relatively narrow spread of parallel free-space beams in a linear arrangement for the wavelength cross connect. Even when twenty-four fibers are connected to the cross connect, they are concentrated to an overall width of only about 1 mm. This narrow beam spread substantially eases the off-axis performance required of the free-space optics and reduces the extent of the MEMS array in the fiber direction. The design allows shorter focal length lenses and significantly reduces the overall size of the package. It is also more reliable and highly tolerant to environmental stress. Without a concentrator, the number of fibers connected to the cross connect would be severely limited.

Figure 12:
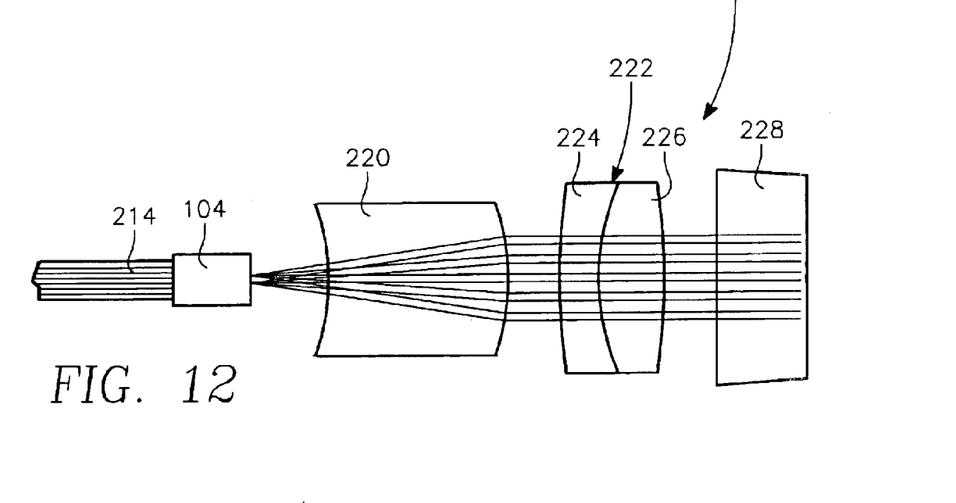
FIG. 12 is a schematic view of the input (collimating) optics of the wavelength cross connect of FIG. 2.

The collimating lens system 106 is illustrated in more detail in the cross-sectional view of FIG. 12. The free-space beams output by the waveguides, whether planar or fiber, of the concentrator 104 are divergent and have a curved field. This discussion will describe all the beams as if they are input beams, that is, output from the concentrator to the free-space optics. The beams are in fact optical fields coupled between optical elements. As a result, the very same principles apply to those of the beams that are output beams which eventually reenter the concentrator 104 for transmission onto the network.

The beam output from the concentrator 104 into the cross connect pass through a field-flattening lens 220 in order to flatten what would otherwise be a curved focal plane of the collimator lens. The field-flattening lens 220 accepts a flat focal plane for the multiple parallel beams emitted from the concentrator. In the reverse direction, the field-flattening lens 220 produces a flat focal plane and parallel beams compatible with the end of the concentrator 104 to assure good coupling to the single-mode waveguide in the concentrator.

In many optical systems, an image is formed on a curved, non-planar surface, typically by beams which are non-parallel to each other. In many applications such as photographic imaging systems, such minor deviations from a flat field are mostly unnoticeable and inconsequential. However, for a cross connect based on free-space optics, parallel single-mode fibers, small parallel beams, and planar mirror arrays, a curved image can degrade coupling efficiency at positions displaced away from the optical axis. Performance is greatly improved if the optics produce a flat focal plane at the concentrator 104 and at the fold mirror 124 since an image of the waveguides at the face of the concentrator exits at the fold mirror 124, and on the return trip the fold mirror 124 will be imaged onto the concentrator waveguide ends. Hence the ends of the input waveguides in the concentrator 104 are imaged onto the ends of the output waveguides in the concentrator 104, and the efficiency of coupling into the single-mode waveguides strongly depends on the quality of the image. Without the field-flattening lens, it would be very difficult to build a WXC with more than a few fiber ports because the error in focus would significantly increase for fibers displaced away from the optical axis. A field-flattening lens is designed as an optical element with negative focal length and is thicker at its periphery than at its optical axis in the center. The basic function of the thicker glass at the periphery is to delay the focus of the beams passing therein. The delayed focus serves to create a flat plane of focus points for all beams rather than a curved locus of foci that would occur otherwise. A field-flattening lens may be implemented as a single lens, a doublet, or other lens configuration.

A field-flattening lens may in the absence of further constraints produce an optical field in which the off-axis beams approach the flat focal plane at angles that increasingly deviate from normal away from the optical axis. Such non-perpendicular incidence degrades optical coupling to fibers arranged perpendicular to the flat focal plane. Therefore, performance can be further improved if the beams are made to approach the focal plane in parallel and in a direction normal to the flat focal plane. This effect of producing parallel beams is referred to as telecentricity, which is aided by long focal lengths.

After the field-flattening lens 220, the beams pass through a collimating doublet lens 222 consisting of a concave lens 224 joined to a convex lens 226. The doublet lens 222 may be a standard lens such as Model LAI-003, available from Melles Griot, which offers superior collimating and off-axis performance. The effective focal length f, of the assembly may be about 14 mm. The collimating lens 222 is illustrated as following the field-flattening lens 220, but their positions can be reversed with little change.

A prism 228, which may be a simple wedge, is placed between the collimating lens 222 and the diffraction grating 108. The prism 228 pre-corrects for the astigmatism introduced by the diffraction grating 108. The wedge angle of the prism, along with the type of glass from which it is made, allows elliptically shaped (or astigmatic) beams to be created. If the prism 228 is composed of the common BK& optical glass, the wedgle angle is typically on the order of 25° to compensate for the type of diffraction grating 108 considered for the invention. The ellipticity counteracts a similiar ellipticity that is an undersirable by-product of diffraction gratings. The net result of the prism and grating is a distortion-free optical beam that can be efficiently processed by the remaining optical components in the system and ultimately coupled with high efficiency back into the small core of a single-mode fiber. The field-flattening lens, collimating doublet lens 22, and the prism 228 are hereafter referred to as the front-end optics.

The next major component is the diffraction grating 108 of FIG. 2 in which the grating lines are perpendicular to the principal optical plane of the wavelength cross connect 100. The diffraction grating angularly separates the multi-wavelength input beams into wavelength-specific sub-beams propagating in different directions parallel to the principal optical plane, or alternatively serves to recombine single-wavelength sub-beams into a multi-wavelength beam. The grating 108 is uniform in the fiber direction perpendicular to the principal optical plane, and its uniformity allows its use for signals to and from multiple input and output fibers. The line density of the grating should be as high as possible to increase spectral dispersion but not so high as to severely reduce diffraction efficiency. Two serially arranged gratings would double the spectral dispersion. However, a single grating with a line density of 1100 lines/mm has provided satisfactory performance. The grating is aligned so that the beam from the collimating lens system 106 has an incident angle of 54° on the grating 108, and the diffracted angle is about 63°. The difference in these angles results in optical astigmatism which is compensated by the previously mentioned prism 228. The potentially significant polarization sensitivity of the grating is mitigated by the quarter-wave plate 116, to be described somewhat later. In brief, the diffraction efficiency of a grating is generally dependent on the characteristics of the polarization of the light with respect to the groove direction on the grating, reaching extrema for linear polarizations that are parallel and perpendicular to the grooves.

After the diffraction grating 108, the next major component is the long-focus lens 114, which forms part of the back-end optics. It is preferably a doublet lens having a focal length $f_2$ determining the optical magnification in the fiber direction according to the ratio $f_2/f_1$. The magnification sets the inter-mirror spacing for a given waveguide spacing of the concentrator 106 since the MEMS plane is at or very close to a conjugate image of the concentrator 106. An example of the long-focus lens 114 is Model LAO-277 available from Melles Griot having a focal length $f_2$ of 355 mm. In combination with the previously described collimating lens, the inter-fiber magnification is most preferably about 25. A minimum of magnification of 10 and preferably of at least 20 is desired so that the single-mode waveguide ends, which are spaced as closely together as possible to ease the optical design, will image on the MEMS mirror array in beam widths many times larger than the optical wavelengths. The magnification also allows easy fabrication of reasonably sized MEMS mirrors. However, the magnification should not be so large, for example no larger than 50 or 100, that the MEMS chip becomes too large for acceptable yields. As a result, a 30 μm waveguide spacing in the concentrator 106 requires a 1050 μm MEMS mirror spacing in the fiber direction when an additional factor of 1.414 is introduced to account for the 45° tilt of the MEMS mirror array.

The focal length $f_2$ of the long-focus lens 114 also determines the spot size of the optical beams on the MEMS mirrors and the depth of focus, alternately expressed as the Rayleigh length $Z_O$. A long Rayleigh length prevents excessive beam divergence in the space between the MEMS mirror and the folding mirror. However, $Z_0$ should be no longer than necessary since the spot size on the mirror is proportional to $Z_0$, and smaller spot sizes are generally preferred.

The long-focus lens 114 should be placed one focal length $f_2$ away from the diffraction grating 108 for reasons related to those discussed previously for the telecentricity of the frontend optics. With a single lens 114 in the back-end optics the function of telecentricity in the wavelength direction is achieved by simply placing the lens one focal length away from the grating 108. However, this invention does not depend on the use of just one lens in the backend optics. In fact, the overall length of the back-end optical path can be physically compressed on the order of 50% to permit shrinking of the package by employing additional optical elements in a traditional telephoto arrangement. In this case telecentricity is achieved by subtly changing the curvature of lens surfaces, and the specific design is greatly aided by computer-automated optimization algorithms such as CodeV produced by Optical Research Associates pf in Pasadena, Calif.

In the defined fiber direction of the optical system telecentricity is not a critical issue, and "toe-in" beams can even be beneficial in the reducing the required major-axis tilt angle of the MEMS mirrors as discussed previously. However, in the wavelength direction of the optical system, if the beams approach the MEMS array 122 at non-normal angles, then the MEMS mirrors must be able counteract this deviation by tiliting about their wavelength (minor) axis. In addition, the position of the MEMS array 122 along the optical axis becomes critical in order to properly intersect the mirrors with the angularly deviating beams of light, which adds to the alignment complexity of the optical system. It is therefore desirable, especially in the wavelength direction, to produce beams of light that are parallel, or telecentric, to the optical axis of the system. The telecentricity assures that the sub-beams angularly diverging from the diffraction grating 108 approach the MEMS mirrors in parallel at least with respect to the wavelength direction. As a result, the position of the mirrors along the beams becomes less critical. The parallelism also prevents angular deviation on the return path. Any angular deviation between the wavelength-separated sub-beams would cause returning beams to strike the diffraction grating 108 at incorrect angles and make it almost impossible to recombine the multiple wavelength signals into a single output fiber. Also, the mirrors need not be steerable in the plane of dispersion, that is, about the minor axis, in order to compensate for the angle of the beams. The elimination of steerability in the second direction allows micromirrors to be used having only a single steering axis rather than two, thereby greatly simplifying the MEMS structure, its manufacturing, and the associated control circuitry so that the wavelength-separated sub-beams propagate in parallel. If only one tilting axis is needed, specifically the major axis, the number of electrodes and associated electrodes is reduced by one-half, and the resulting reduction in heat load benefits both reliability and lifetime.

Figure 6:
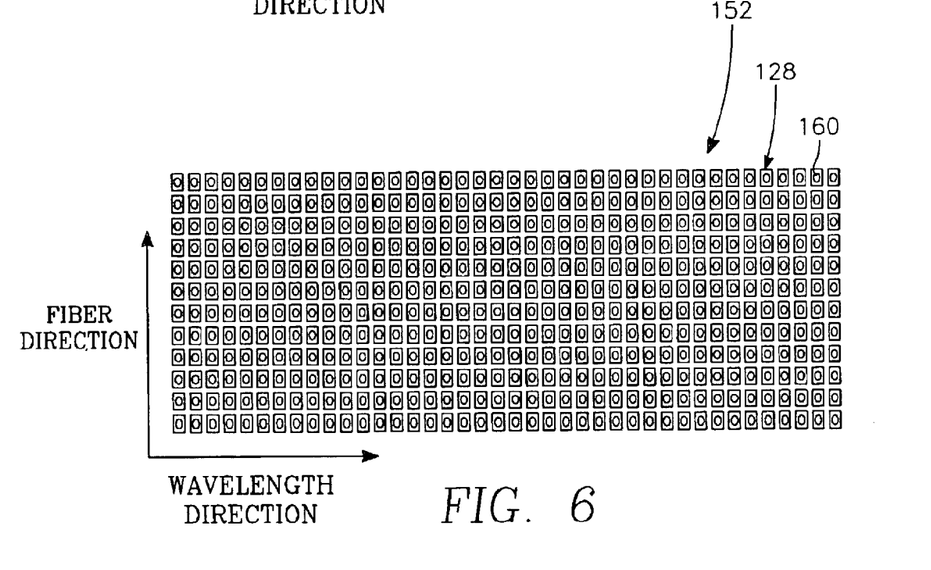
FIG. 6 is full plan view of the micromirror array of FIG. 5.

For a WXC having significantly more fiber ports or wavelengths than the number illustrated in FIG. 6, an additional lens can be added to the back-end optics to flatten the image field produced by them. The additional field flattening becomes necessary as the beam paths for the additional fibers or wavelengths deviate farther from the central optic axis such that the Rayleign length is no longer adequate by itself to absorb the difference in path lengths occurring between the on-axis and off-axis beams. Analogously to the field flattening in the front-end optics, a back-end field-flattener lens allows the focus of all possible beams to form in a common flat plane. As discussed previously, the optical system functions to image the flat face of concentrator 104 on the fold mirror 124 and then back again onto the concentrator face in a round trip through the switching optics. As a result of field flattening, the effect of path length differences between the various beams becomes inconsequential. Thus, for very large numbers of fibers and wavelengths, care must be exercised in the back-end optics to achieve the necessary level of both telecentricity and field-flattening. Otherwise, insertion loss becomes unacceptable for off-axis beams.

The quarter-wave plate 116 is placed between the diffraction grating 108 and the MEMS array 122, preferably immediately after the long-focus lens 114. Every wavelength-separated sub-beam passes twice through the quarter-wave plate 116 so that its polarization state is altered between input and output. Therefore, the diffraction grating 108 twice diffracts any wavelength-specific sub-beam, which has twice passed through the quarter-wave plate 116, once with a first (and arbitary) polarization and once again with a polarization state that is complementary to the first polarization state from the perspective of the diffraction grating 108. As a result, any polarization dependence introduced by the diffraction grating 108 is canceled. That is, the net efficiency of the grating 108 will be the product of its S-state and P-state polarization efficiencies and hence independent of the actual polarization state of the input light.

The beams and sub-beams described to this point propagate substantially parallel to a horizontal principal optical plane. Any deviation from the plane is less than 5° and preferably less than 1°, the least deviation being the best However, the MEMS array 122 is tilted at 45° to the principal optical plane and the folding mirror 124 is positioned beneath it in a plane parallel to the principal optical plane and perpendicular to the optical axis after reflection from the micromirrors. As a result, the sub-beams propagate substantially vertically between the MEMS 122 and the folding mirror. Such a bent arrangement conveniently separates the beam switching area from the paths of the incoming and outoing beams but is not strictly depedent on a 45° MEMS tilt.

The switched optical connection of corresponding wavelength channels between input and output fibers proceeds as follows. An optical sub-beam corresponding to a unique input fiber and optical wavelength strikes the corresponding input MEMS mirror and is deflected towards the fold mirror. The angle of the input mirror is actively controlled by drive circuitry so that the sub-beam, after striking the fold mirror, lands precisely at the center of the desired output mirror. The output mirror is actively tilted by the drive circuitry to the required angle such that the sub-beam, after reflection, is properly aligned to the concentrator waveguide associated with the particularly output mirror.

In view of this procedure, an effective optical path, that is, switch state, can be created only when an input and an output mirror are mutually co-aligned. In the described design, the MEMS tilt accuracy should be better than 0.010 to obtain the desired low insertion loss. The need to mutually align two micromirrors provides channel isolation because light from other fiber/wavelength combinations is significantly blocked from entering the complex chosen path, thereby resulting in extremely low optical cross talk (alternatively phrased as high isolation or directivity). Low cross talk is typically critical for WDM telecommunications systems. Further, light of a particular wavelength can be switched from any input fiber to any output fiber without concern for any other optical paths in the system. The extremely low transient cross talk makes the free-space WXC a true non-blocking switch.

The described embodiment was based on a 40 channels in the 1550 nm band. However, the design is easily adapted to conform to various regions of the optical spectrum, including S-band, C-band, and L-band, and to comply with other wavelength grids, such as the 100 GHz, 50 GHz, etc. grids published by ITU.

The described design can be implemented with MEMS mirrors capable of tilting by ±4.6° in the major axis. The minor axis tilt for a two-axis MEMS mirror array may be significantly less since it typically used for tuning, not switching. Such MEMS mirror arrays are possible with existing technology.

The described design provides several advantages for its easy insertion into WDM systems of either a few wavelengths or for dense WDM (DWDM) systems having many wavelengths. It produces lower polarization mode dispersion (PMD) and low chromatic dispersion. Low PMD naturally follows from the free-space optics. Low chromatic dispersion is achieved by assuring that the lenses are achromatic. The resulting performance exceeds present-day industry standards.

The MEMS micromirror array drives most of the design requirements and system cost. The 12×40 array described before is relatively large in the wavelength direction. Such size is possible, but 100% chip yield maybe questionable until manufacturing techniques are further perfected. Further, there is a desire to increase the number W of WDM wavelengths to 80 and perhaps greater. At present, a 12×80 micromirror array is challenging though not impossible to fabricate. Further, increasing the beam array field of FIG. 6 to 50 mm in the wavelength direction presents significant problems with off-axis aberrations in the optics.

Figure 13:
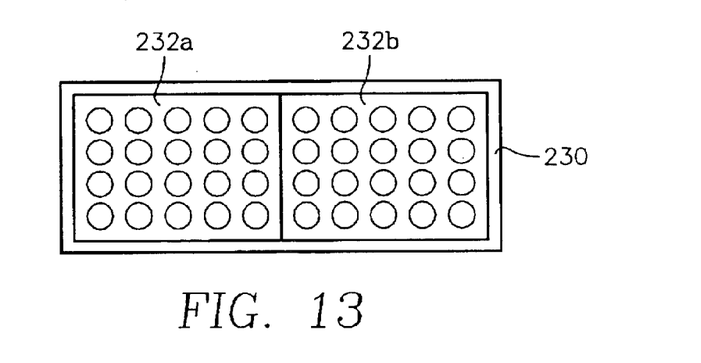
FIG. 13 is a plan view of a micromirror array formed as a mosaic of arrays.

A first embodiment of implementing a $12^f \times 80^w$ WXC while using two 12×40 MEMS arrays is illustrated schematically in the plan view of FIG. 13. Two 12×40 MEMS arrays 232a, 232b are bonded onto a common substrate 230 in mosaic style. If the replication is in the wavelength direction, the locations of the micromirrors in the two arrays 232a, 232b must be carefully aligned in the wavelength direction since a common diffraction grating is producing the wavelength separated components on the two arrays 232a, 232b. If the replication is in the fiber direction, the alignment is less critical since the mirror tilt angles can be adjusted to couple the mirrors on the different arrays 232a, 232b through the fold mirror. Of course, the mosaic can be extended to yet larger one- and two-dimensional arrays of array chips.

Figure 14:
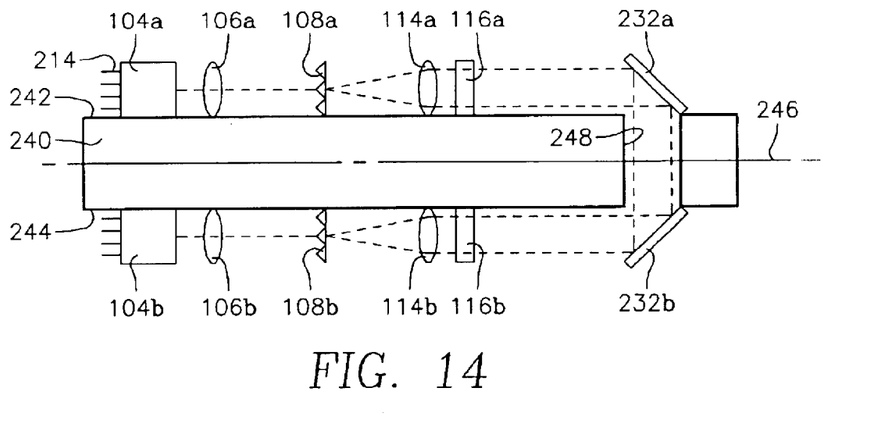
FIG. 14 is a side view of a wavelength cross connect having separate input and output optics and mirror arrays.

A second embodiment illustrated schematically in FIG. 14 is particularly useful for increasing the number of fibers, for example, a $24^f \times 40^w$ WXC using two 12×40 MEMS micromirror arrays. A two-sided baseplate 240 supports equivalent optics on both its top side 242 and its bottom side 244 separated by a median plane 246. The optics on the two sides 242, 244 are distinguished according to whether they are associated with input or output. Twelve input fibers are coupled through a first concentrator 104a and a first collimator lines system 106a to a first diffraction grating 108. A first focusing lens 114a focuses the 12×40 sub-beams toward a first 12×40 MEMS array 232a. On the bottom side 244, twelve output fibers are coupled to a second concentrator 104b. A second collimating lens system 106b, a second diffraction grating 108b, a second focusing lens 114b, a second quarter wave plate 116b, and a second 12×40 MEMS array 232a are located on the bottom side 244 in symmetric locations about the median plane 246 with corresponding optical elements on the top side 242.

The two 12×40 MEMS arrays 232a, 232b are optically coupled through an aperture 248 in the base plate 240. A folding mirror is not required. Instead, the median plane 246 represents the symmetry plane of the system. It is of course appreciated that the baseplate can extend vertically with replicated optics on its two lateral side or that all these optical elements can be placed side by side and supported on one side of a baseplate. However, the two-sided arrangement minimizes the beam length between the two MEMS arrays 232a, 232b and more easily allows the extended beams paths for the rest of the optics of the sort shown in FIG. 2.

Figure 15:
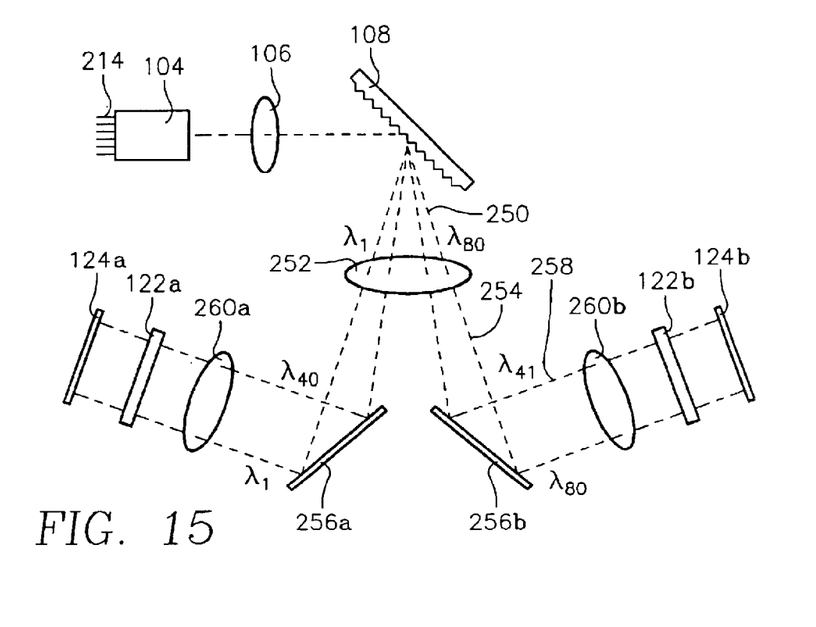
FIG. 15 is a schematic illustration of a split beam wavelength cross connect.

A third embodiment illustrated schematically in FIG. 15 is particularly useful for doubling the number of wavelengths without the need for significant change in most of the optical components. In particular, a $12^f \times 80^w$ optical switch can rely on two 12×40 MEMS micromirror arrays. Six input fibers and six output fibers 214 are capable of carrying 80 WDM channels, which may be chosen, for example, to comply with industry-standard wavelength grids such as promulgated by the International Telecommunications Union (ITU). The twelve fibers 214 coupled through the concentrator 104 and the collimating lens system 106 to the diffraction grating 108 which produces 80×12 collimated beams 250 identified according to the twelve fibers and the eighty WDM wavelengths $\lambda_1$ to $\lambda_{80}$. A short-focus lens 252 receives the collimated beams 250 and produces condensing beams 254 that are focused on two mirrors 256a, 256b. The mirrors are disposed so that the first mirror 256a receives the condensing beams 254 for wavelengths $\lambda_1$ through $\lambda_{40}$ for all the fibers 214 while the second mirror 256b receives the condensing beams 254 for wavelength $\lambda_{41}$ through $\lambda_{80}$ for all the fibers 214. The two mirrors 254a, 256b can be replaced by a single prism. The two beams 258 reflected from the respective mirrors 256a, 256b are expanding beams. Long-focus lenses 260a, 260b in conjunction with unillustrated quarter wave plates refocus the beams through respective 12×40 MEMS micromirror arrays 122a, 122b onto associated fold mirrors 124a, 124b. The spatial segregation of wavelength channels into parallel MEMS arrays can be carried further.

The scaling to larger size switches can also be accomplished on a systems level mostly outside of the optical cross connect. By way of illustration, a $12^f \times 80^w$ WXC illustrated in FIG. 16 relies upon two independent $12^f \times 40^w$ WXCs having respective 12×40 MEMS micromirror arrays. Each of twelve input and output fibers 270 are connected to the common port of a respective 3 dB splitter 272. The two split-out ports of each 3 dB splitter 272 are connected via connecting fibers 274 to respective ones of a first and a second $12^f \times 40^w$ wavelength cross connect (WXC) 276a, 276b. The 3 dB splitters 272 are typically implemented by fusing together two fibers in a gradual Y-junction, and they may serve as either a splitter or combiner depending upon whether the signal is arriving from the left on the single input/output fiber 270 or from the right on one of the two connecting fibers 274. This simple implementation of a splitter results in an inherent 6 dB loss in the in a round trip, but there is typically a smaller addition loss in the actual device depending upon its quality of fabrication.

Figure 16:
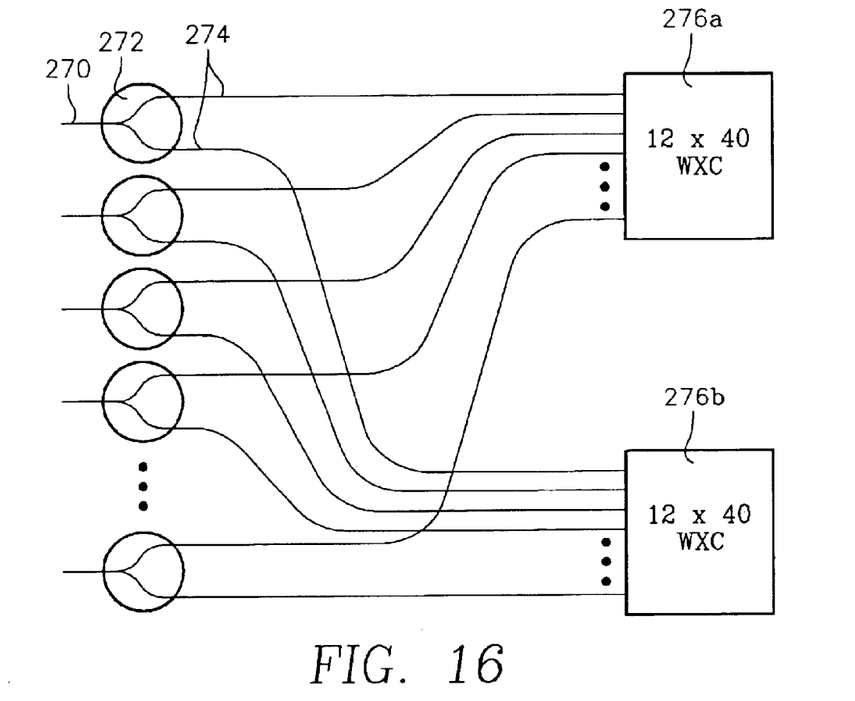
FIG. 16 is a circuit diagram of a wavelength cross connect in which beams are passively split and combined through 3 dB couplers.

All eighty wavelength components from the twelve fibers 270 are coupled to the $12^f \times 40^w$ WXCs 276a, 276b, each of which includes its own 12×40 micromirror array. However, each of the $12^f \times 40^w$ WXCs 276a, 276b are designed to couple only some of the wavelengths to their micromirror array and to suppress the rest. For example, referring back to FIG. 2, one of the $12^f \times 40^w$ WXCs 276a, 276b could have its 12×40 MEMS chip 122 positioned to intercept only the first forty wavelength channels $\lambda_1$ to $\lambda_{40}$ while the remaining wavelength channels $\lambda_{41}$ to $\lambda_{80}$ fall outside of the MEMS chip 122. An unillustrated absorber, potentially as simple as flat black paint, is placed in the paths of the suppressed channels to prevent extraneous radiation within the cross connect package. The other $12^f \times 40^w$ WXC has a complementary design in which the differently located 12×40 MEMS chip 122 selectively switches the wavelength channels $\lambda_{41}$ to $\lambda_{80}$ while the remaining wavelength channels $\lambda_1$ to $\lambda_{40}$ are suppressed.

In this design, a particular wavelength channel for all twelve fibers is switched within one of the two $12^f \times 40^w$ WXCs 276a, 276b. There is no question of needing to transfer signals between the two WXCs 276a, 276b. When the switched signals are directed back to the output fibers 270, there should be no question of the splitters 272 combining interfering signals of a same wavelength because the unswitched signals have been selectively absorbed.

Figure 17:
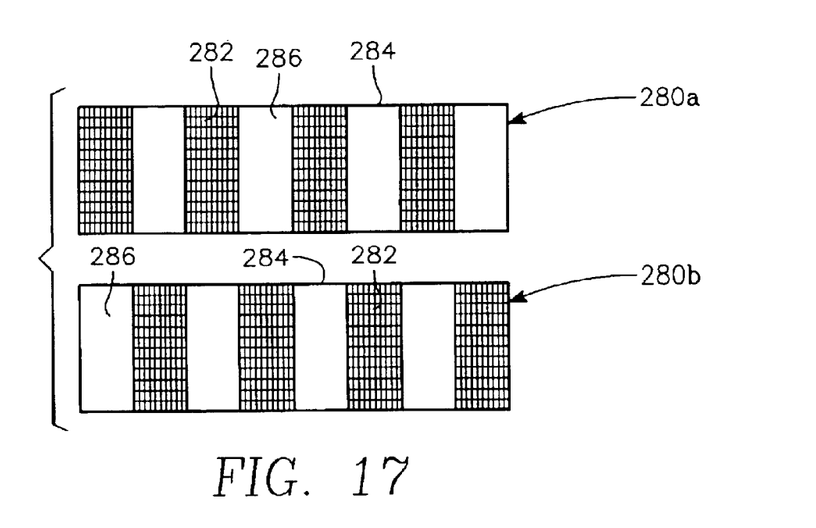
FIG. 17 is a plan view a mosaic of mirror arrays.

The complexity of the MEMS arrays can be further reduced in a manner similar to the mosaic patterning of FIG. 13. As illustrated in FIG. 17, functional 12×40 micromirror arrays 280a, 280b for the respective $12^f \times 40^w$ WXCs 276a, 276b are formed by four 12×10 MEMS arrays 282 bonded to separate areas of substrates 284 with absorbing blank spaces 286 formed between the 12×10 MEMS arrays 282 in the wavelength direction. The extent of the individual blank spaces 286 in the wavelength direction is the same as that of the 12×10 MEMS arrays 282, allowing for some edge effects. However, the blank spaces 286 of the first 12×40 micromirror array 280a are aligned with the 12×10 MEMS arrays 282 of the second 12×40 micromirror array 280b, and vice versa. The effect is that the first $12^f \times 40^w$ WXC 276a switches the wavelength channels $\lambda_1$–$\lambda_{10}$, $\lambda_{21}$–$\lambda_{30}$, $\lambda_{41}$–$\lambda_{50}$, and $\lambda_{61}$–$\lambda_{70}$ while the second $12^f \times 40^w$ WXC 276b switches the remaining forty wavelength channels.

The design of FIG. 16 can be generalized to multiple stages of splitting or combining signals. As illustrated schematically in FIG. 18, the intermediate fibers 274 bearing the splitout signals of the first stage of splitters 272 are connected to the common ports of a second stage of splitters 290. In turn, second intermediate fibers 292 connected to the split-ports of the second-stage splitters 290 are connected to respective ones of four $12^f \times 20^w$ WXCs 294. This design simplifies the MEMS arrays. However, it introduces an inherent 12 dB splitting loss and complicates the fiber wiring.

Figure 18:
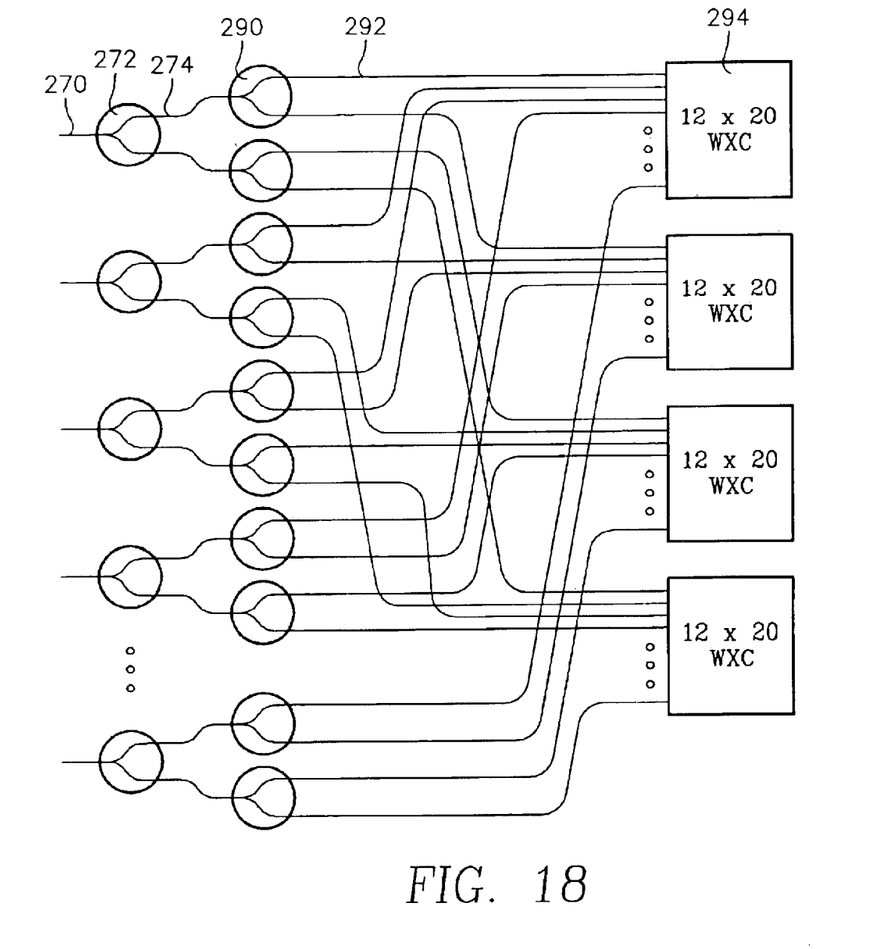
FIG. 18 is a circuit diagram derived from the circuit of FIG. 16 using two stages of 3 dB couplers.

As should be apparent from FIG. 18, four $12^f \times 40^w$ WXCs would allow the total wavelength capacity to be increased to 160 wavelengths.

The undesirable excess splitting loss resulting from the multi-stage approach generally illustrated in FIG. 18 can be substantially reduced by replacing the simple power splitters with commercially available wavelength interleavers, such as those available from Oplink Communications, Inc. and from WaveSplitter Technologies, inc. Interleavers function to split signal on the basis of wavelength rather than power in that they send alternate wavelength out on separate fiber ports. For example, the even numbered wavelengths are segrated to exit the interleaver on one fiber while the odd numbered wavelengths exit on another fiber. The insertion loss for an interleaver can be made as low as about 1 dB. Interleavers can be daisy-chained to provide the desired degree of wavelength segregration. For example, in a two-stage interleaver, every fourth wavelength exits on one fiber, etc. Viewed in the reverse direction, interleavers operate to combine wavelength components. With reference again to FIG. 18, if the power splitters 272, 290 are replaced one-for-one by interleavers, then each of the four $12^f \times 40^w$ WXCs now addresses every fourth wavelength. Further, the design of each WXC is substantially relaxed by needing to operate on a wavelength grid that is four times coarser than the original grid. Further, there in no longer a need for the channel suppression (absorber) regions previously described. Yet further, the inherent excess splitting loss is reduced to about 4 dB compared to about 12 dB for systems based on power splitters.

Both optical power splitters and interleavers are passive reciprocal devices, and both are included in a larger class of optical divider/combiners.

The wavelength cross connect illustrated in FIG. 2, even when modified according to some of the secondary embodiments, offers many advantages. However, the invention is not so limited and many aspects of the invention may be applied to other geometries and optical switching devices. A system, such as that of FIG. 14, that lacks the folding mirror but includes separate input and output MEMS mirror arrays directly coupled together enjoys much the same capability as the system of FIG. 2. Such a system may have combined optics including, for example, the concentrator and diffraction grating, or may have separate input and output optics. White-light systems switch the entire transmission of one input fiber to a selected output fiber. A white-light cross connect can be adapted from the system of FIG. 2 by eliminating the diffraction grating. If the MEMS mirrors are tiltable in two-dimensions, the fibers can be bundled in a two-dimensional array.

Other types of MEMS mirror arrays may be used, including those relying on flexing elements other than axial torsion beams and those moving in directions other than tilting about a central support axis. Wavelength dispersive elements other than diffraction gratings may be used. The concentrator, although important, is not crucial to many of the aspects of the invention. Further, the concentrator may be implemented in an optical chip serving other functions such as amplification or wavelength conversion.

Although the invention has been described with respect to a wavelength cross connect, many of the inventive optics can be applied to white-light optical cross connects that do not include a wavelength dispersive elements. Although tilting micromirrors are particularly advantageous for the invention, there are other types of MEMS mirrors than can be electrically actuated to different positions or orientations to effect the beam switching of the invention.

The invention provides a small, rugged, and economical optical cross connect capable of switching many wavelength channels between many fibers. However, the many aspects of the invention may be applied to other applications than the described wavelength cross connect.

What is claimed is:

1. A wavelength cross connect, comprising:
   at least two optical waveguides having waveguide ends arranged in a first linear array extending in a first direction perpendicular to a propagation direction of light carried by said optical waveguides;
   a wavelength dispersive element coupled to beams associated with each of said waveguide ends and spectrally separating wavelength components of said beams with wavelength-separated sub-beams disposed in a two-dimensional array arranged in a first waveguide direction and a first wavelength direction;
   a first set of free-space optics coupling said waveguides and said wavelength dispersive element;
   a plurality of micro electromechanical system (MEMS) mirrors arranged in a first MEMS mirror array arranged in at least a second wavelength direction to receive respective ones of said wavelength-separated sub-beams and selectively steering them.

2. The cross connect of claim 1, wherein said first MEMS mirror array is a two-dimensional array additionally extending in a waveguide direction.

3. The cross connect of claim 2, further comprising a fold mirror coupling pairs of mirrors in said first MEMS mirror array.

4. The cross connect of claim 1, further comprising a second MEMS mirror array of MEMS mirrors extending at least in a third waveguide direction.

5. The cross connect of claim 1, further comprising a second set of free-space optics extending along said optical axis in said principal optical plane and coupling said wavelength dispersive element to said first MEMS mirror array.

6. The cross connect of claim 5, wherein first beams passing between said first set of free-space optics and said wavelength dispersive element cross beams passing between said wavelength dispersive element and said MEMS mirrors.

7. The cross connect of claim 6, wherein a magnification of a combination of said first and second free-space optics is between 10 and 100.

8. A wavelength cross connect, comprising:
   at least three optical waveguides having waveguide ends arranged in a first linear array extending in a first direction perpendicular to a principal optical plane;
   a wavelength dispersive element coupled to beams associated with each of said waveguide ends and spectrally separating wavelength components of said beams with wavelength-separated sub-beams disposed in a two-dimensional array arranged in a first waveguide direction and a first wavelength direction;
   a plurality of micro electromechanical system (MEMS) mirrors arranged in a first MEMS mirror array arranged in at least a second wavelength direction and coupling at least one of said waveguides to a selected one of others of said waveguides; and
   a first set of free-space optics extending along said optical axis in said principal optical plane and coupling said wavelength dispersive element to said first MEMS array.

9. The cross connect of claim 8, wherein said first set of free-space optics includes a field-flattening lens.

10. The cross connect of claim 9, wherein said field-flattening lens has a negative focal length and its periphery is thicker than is its center.

11. An optical cross connect, comprising:
    a plurality of input waveguides carrying optical input signals input to said cross connect;
    a plurality of output waveguides carrying optical output signals switched by said cross connect and output therefrom;
    a plurality of movable mirrors formed in a micro electromechanical system for selectively switching optical signals from said input waveguides to selected ones of said output waveguides; and
    a single set of free-space optics extending along a single optical path extending from a first end adjacent said input and output waveguides to a second end adjacent said movable mirrors, wherein all of said input and output signals pass through said single set of free-space optics.

12. The cross connect of claim 11, wherein said single set of free-space optics includes a single wavelength dispersive element.

13. The cross connect of claim 12, wherein said single set of free-space optics includes a quarter-wave plate disposed between said wavelength dispersive element and said mirrors.

14. The cross connect of claim 11, wherein said mirrors switch white-light optical signals.

15. The cross connect of claim 11, wherein said ends of said input and output waveguides are arranged along a single axis substantially transverse to said optical path.

16. The cross connect of claim 11, wherein said waveguides are optical fibers.

17. The cross connect of claim 11, wherein said waveguides are formed in a common substrate.

* * * * *